(12) United States Patent
Lin et al.

(10) Patent No.: US 7,755,713 B2
(45) Date of Patent: Jul. 13, 2010

(54) PERIPHERAL CIRCUIT

(75) Inventors: Heng-Chang Lin, Taichung (TW);
Yu-Fang Wang, Taoyuan County (TW);
Ming-Kang Huang, Taipei County (TW); Chih-Kun Lin, Hsinchu (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 136 days.

(21) Appl. No.: 12/234,700

(22) Filed: Sep. 21, 2008

(65) Prior Publication Data

US 2009/0207369 A1 Aug. 20, 2009

(30) Foreign Application Priority Data

Feb. 15, 2008 (TW) .............. 97105362 A

(51) Int. Cl.
*G02F 1/1333* (2006.01)
*G02F 1/1345* (2006.01)
*G01R 31/00* (2006.01)

(52) U.S. Cl. .................. 349/54; 349/152; 324/770
(58) Field of Classification Search ........... 349/54–55, 349/152; 324/770
See application file for complete search history.

(56) References Cited

U.S. PATENT DOCUMENTS 6,028,442 A * 2/2000 Lee et al. .................. 324/770
6,781,403 B2 * 8/2004 Kim .......................... 324/770
6,836,140 B2 * 12/2004 Fujikawa et al. ........... 324/770
6,930,744 B1 * 8/2005 Ukita ........................ 349/152
7,288,955 B2 * 10/2007 Jeon .......................... 324/770
7,518,690 B2 * 4/2009 Komaju ..................... 349/151
7,535,248 B2 * 5/2009 Chen et al. ................. 324/770

FOREIGN PATENT DOCUMENTS

JP 06-095143 4/1994
JP 08-250738 9/1996

* cited by examiner

*Primary Examiner*—Andrew Schechter
*Assistant Examiner*—Michael P Mooney
(74) *Attorney, Agent, or Firm*—Jianq Chyun IP Office

(57) ABSTRACT

A peripheral circuit disposed on a substrate having an active device array is provided. The peripheral circuit includes first test pads, second test pads, first lines, and second lines. The first and the second lines are electrically connected to the active device array. Each first test pad includes a first conductive layer and a second conductive layer electrically connected to the first conductive layer. The first conductive layer electrically connects at least two of the adjacent first lines. The second test pads are interposed between the first test pads and the active device array. Each second test pad includes third conductive layers and a fourth conductive layer electrically connected to the third conductive layers. The first lines pass through the third conductive layers and are insulated from the fourth conductive layer. Each third conductive layer is electrically connected to one of the adjacent second lines respectively.

12 Claims, 5 Drawing Sheets

PERIPHERAL CIRCUIT

CROSS-REFERENCE TO RELATED APPLICATION

This application claims the priority benefit of Taiwan application serial no. 97105362, filed on Feb. 15, 2008. The entirety of the above-mentioned patent application is hereby incorporated by reference herein and made a part of this specification.

BACKGROUND OF THE INVENTION

1. Field of the Invention

The present invention relates to a liquid crystal display (LCD), and more particularly to a peripheral circuit disposed on an active device array substrate of an LCD.

2. Description of Related Art

Nowadays, multimedia technologies have been well developed, which mostly results from the progress of semiconductor devices and display apparatuses. Among various displays, LCDs with superior features such as high definition, great space utilization, low power consumption and no radiation have gradually become the mainstream of the market.

Taking a thin film transistor LCD (TFT-LCD) module for example, it is mainly constituted by an LCD panel and a backlight module. The LCD panel usually includes a thin film transistor array substrate (TFT array substrate), a color filter substrate (C/F substrate) and a liquid crystal layer interposed therebetween. On the other hand, the backlight module provides a planar light source for the LCD panel, such that the LCD module is able to perform a display function.

The TFT array substrate can be divided into a display region and a peripheral circuit region. A plurality of pixel units is disposed in arrays on the display region, and each of the pixel units includes a TFT and a pixel electrode connected to the TFT. Moreover, a plurality of scan lines and a plurality of data lines are disposed on the peripheral circuit region and the display region. The TFT of each of the pixel units is controlled by the corresponding scan line and data line.

After a manufacturing process of the TFT array substrate is completed, an electrical inspection is often performed on the pixel units on the TFT array substrate, so as to determine whether the pixel units are operated normally. When the pixel units are not able to be operated in a normal manner, defective components (such as the TFT or the pixel electrode) or the circuit can be repaired.

The electrical inspection is usually implemented on the peripheral circuit with use of probes. In particular, the peripheral circuit has a plurality of test pads electrically connected to the scan lines and the data lines. After each of the test pads is contacted by the probes, a test signal is delivered, and thereby it is likely to observe if each of the pixel units is normally operated. Nevertheless, the LCDs are miniaturized and characterized by high resolution, such that the pixel units tend to be densely disposed in the LCDs. Hence, the width of the test pads is reduced little by little. If the width of the test pads is less than the dimension of the probes, it would be unlikely for the probes to precisely detected each of the scan lines or data lines. In other words, one single probe may contact two adjacent test pads simultaneously. As such, defects of the active device array cannot be discovered and rectified.

SUMMARY OF THE INVENTION

The present invention is directed to a peripheral circuit for probing an active device array with high density.

To resolve the above-identified issues, the present invention provides a peripheral circuit suitable for being disposed on a substrate having an active device array. The substrate has one active device array, and the peripheral circuit is electrically connected to the active device array. The peripheral circuit includes a plurality of first lines, a plurality of second lines, a plurality of first test pads, and a plurality of second test pads. Each of the first lines and each of the second lines are electrically connected to the active device array, respectively. Each of the first test pads includes a first conductive layer and a second conductive layer. The first conductive layer is electrically connected to at least two of the adjacent first lines. The second conductive layer is disposed on and electrically connected to the first conductive layer. The second test pads are interposed between the first test pads and the active device array. Each of the second test pads includes third conductive layers and a fourth conductive layer. The first lines pass through the third conductive layers, and each of the third conductive layers is electrically connected to one of the adjacent second lines, respectively. The fourth conductive layer is disposed on and electrically connected to the third conductive layers. In addition, the fourth conductive layer is insulated from the first lines.

According to an embodiment of the present invention, the third conductive layers of each of the second test pads are two in number, and the first lines electrically connected to each of the first test pads are two in number as well.

According to an embodiment of the present invention, the first lines and the second lines are alternately arranged.

According to an embodiment of the present invention, the first lines passing between the third conductive layers of each of the second test pads are two in number, and the first lines are electrically connected to one of the first conductive layers of the two adjacent first test pads.

According to an embodiment of the present invention, the peripheral circuit further includes a first control pad, a second control pad, a plurality of first switching elements, and a plurality of second switching elements. The first switching elements are electrically connected to the first control pad, while the second switching elements are electrically connected to the second control pad. The first lines connected to the same first test pad are electrically connected to the active device array through one of the first switching elements and one of the second switching elements, respectively. Meanwhile, the second lines connected to the same second test pad are electrically connected to the active device array through one of the first switching elements and one of the second switching elements.

According to an embodiment of the present invention, the third conductive layers of each of the second test pads are three in number, and the first lines electrically connected to each of the first test pads are three in number.

According to an embodiment of the present invention, the first lines and the second lines are alternately arranged.

According to an embodiment of the present invention, the peripheral circuit further includes a first control pad, a second control pad, a third control pad, a plurality of first switching elements, a plurality of second switching elements, and a plurality of third switching elements. The first switching elements are electrically connected to the first control pad. The second switching elements are electrically connected to the second control pad. The third switching elements are electrically connected to the third control pad. Here, the first lines connected to the same first test pad are electrically connected to the active device array through one of the first switching elements, one of the second switching elements, and one of the third switching elements, while the second lines connected to the same second test pad are electrically connected to the active device array through one of the first switching elements, one of the second switching elements, and one of the third switching elements.

According to an embodiment of the present invention, the peripheral circuit further includes a plurality of third lines and a plurality of third test pads. The third lines are electrically connected to the active device array. The third test pads are interposed between the second test pads and the active device array. Each of the third test pads includes a plurality of fifth conductive layers and a sixth conductive layer. The first lines and the second lines pass through the fifth conductive layers, and each of the fifth conductive layers is electrically connected to one of the adjacent third lines, respectively. The sixth conductive layer is disposed on and electrically connected to the fifth conductive layers. In addition, the sixth conductive layer is insulated from the first lines and the second lines.

According to an embodiment of the present invention, the first lines, the second lines, and the third lines are alternately arranged.

According to an embodiment of the present invention, the first lines, the second lines, and the third lines are scan lines of an LCD.

According to an embodiment of the present invention, the first lines, the second lines, and the third lines are data lines of an LCD.

In the present invention, multiple lines share the same test pad, such that the first test pads, the second test pads, and the third test pads have increased widths. In comparison with the related art, the peripheral circuit of the present invention can be used to inspect the active device array with a relative high density. Besides, the first switching elements, the second switching elements, and the third switching elements are respectively disposed on the first lines, the second lines, the third lines according to the present invention. In addition, the first switching elements, the second switching elements, and the third switching elements are controlled by the first control pad, the second control pad, and the third control pad. As such, defects in the active device array can be precisely detected for subsequent rectification.

In order to make the aforementioned and other objects, features and advantages of the present invention more comprehensible, several embodiments accompanied with figures are described in detail below.

DESCRIPTION OF EMBODIMENTS

First Embodiment

Figure 1:
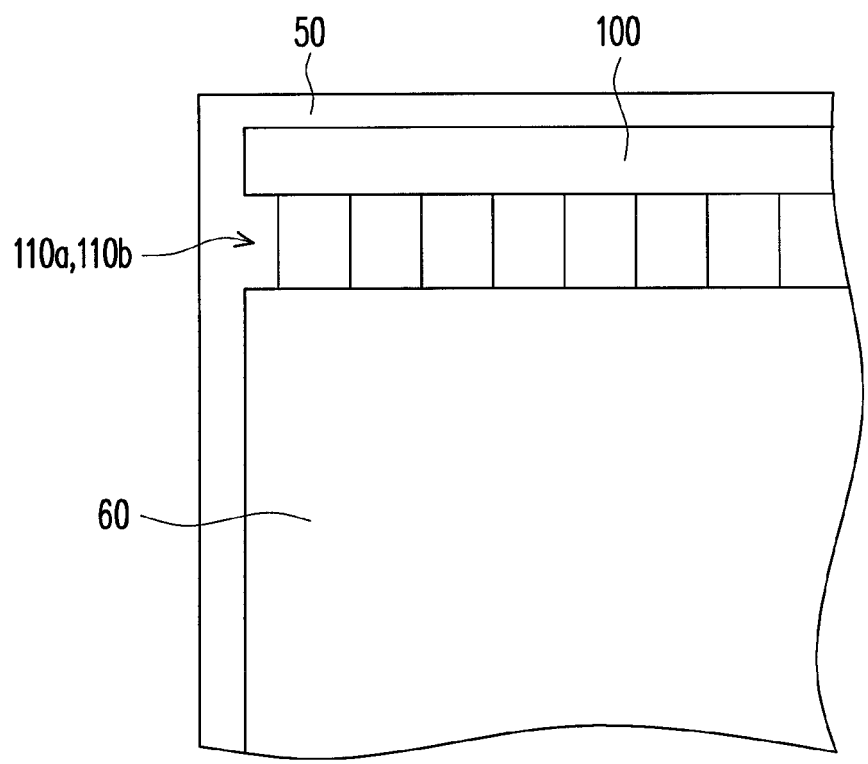
FIG. 1 is a schematic view of the configuration of a peripheral circuit according to a first embodiment of the present invention.
Figure 2:
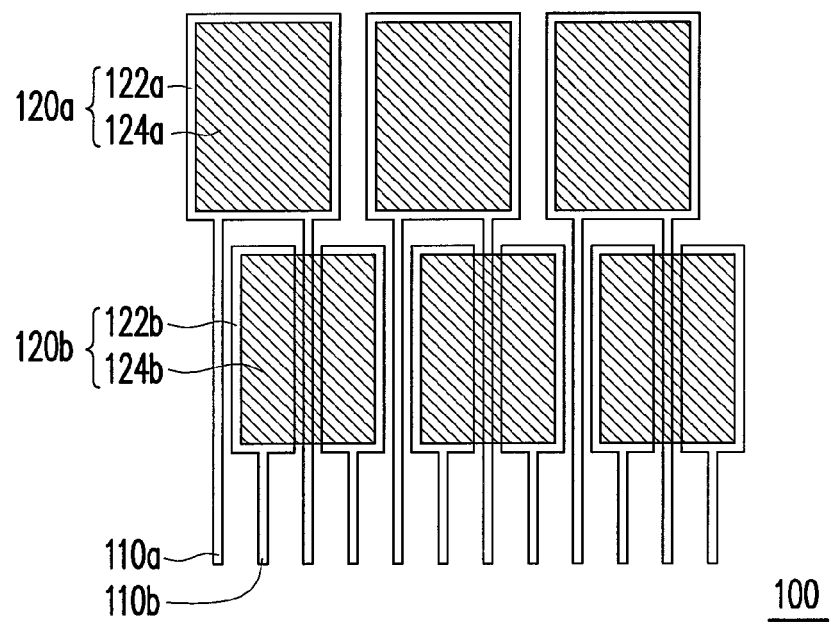
FIG. 2 is a schematic enlarged view of the peripheral circuit depicted in FIG. 1.

FIG. 1 is a schematic view of the configuration of a peripheral circuit according to a first embodiment of the present invention. FIG. 2 is a schematic enlarged view of the peripheral circuit depicted in FIG. 1. Referring to FIGS. 1 and 2, a peripheral circuit 100 can be disposed on a substrate 50. Here, the substrate 50 can be a substrate of an LCD.

The substrate 50 has an active device array 60, and the peripheral circuit 100 is electrically connected to the active device array 60. The peripheral circuit 100 includes a plurality of first lines 110a, a plurality of second lines 110b, a plurality of first test pads 120a, and a plurality of second test pads 120b. The second test pads 120b are interposed between the first test pads 120a and the active device array 60. The first lines 110a are electrically connected to the active device array 60 and the first test pads 120a, while the second lines 110b are connected to the active device array 60 and the second test pads 120b. Each of the first test pads 120a is electrically connected to at least two of the first lines 110a. In brief, the first lines 110a and the second lines 110b are alternately arranged.

Specifically, each of the second test pads 120b includes a fourth conductive layer 124b and a plurality of third conductive layers 122b. Here, a material of the fourth conductive layer 124b is, for example, indium tin oxide (ITO). Alternatively, the material of the fourth conductive layer 124b can also be other transparent metal oxide, such as indium zinc oxide (IZO), aluminum zinc oxide (AZO), and so forth. The fourth conductive layer 124b is disposed on and electrically connected to each of the third conductive layers 122b. Each of the second lines 110b is electrically connected to one of the third conductive layers 122b and the active device array 60.

The first test pads 120a has a second conductive layer 124a and a first conductive layer 122a, and a material of the second conductive layer 124a is, for example, the same as the material of the fourth conductive layer 124b, such as ITO or other transparent metal oxide. The second conductive layer 124a is disposed on and electrically connected to the first conductive layer 122a. Each of the first lines 110a passes between the third conductive layers 122b and is electrically connected to the first conductive layer 122a. Here, each first conductive layer 122a is connected to at least two of the first lines 110a. The fourth conductive layer 124b is insulated from the first lines 110a. For instance, an insulation layer (not shown) can be interposed between the first lines 110a and the fourth conductive layer 124b to isolate the first lines 110a from the fourth conductive layer 124b.

Figure 3:
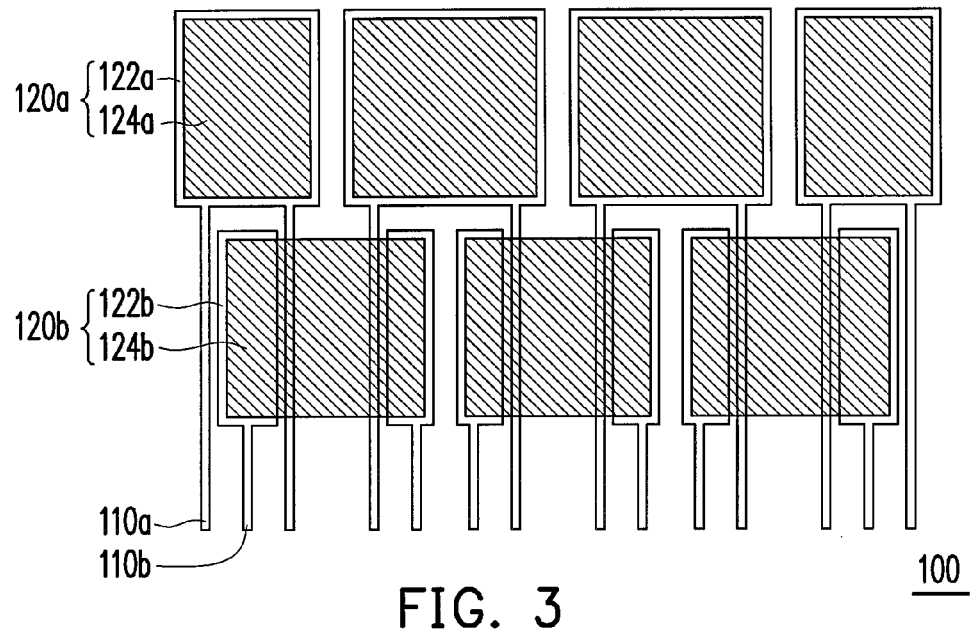
FIG. 3 is a schematic view of another configuration of first lines depicted in FIG. 1.

In the present embodiment, each of the first test pads 120a can be electrically connected to two of the first lines 110a. Each of the second test pads 120b has two of the third conductive layers 122b, and one of the first lines 110a passes between the third conductive layers 122b. In brief, two of the first lines 110a share one of the first test pads 120a, while two of the second lines 110b share one of the second test pads 120b. The first lines 110a and the second lines 110b are alternately arranged. Note that the first lines 110a can also be arranged by one skilled in the pertinent art in a different manner other than in the afore-mentioned way. FIG. 3 is a schematic view of another configuration of the first lines depicted in FIG. 1. Referring to FIG. 3, two of the first lines 110a share one of the first test pads 120a, while two of the second lines 110b share one of the second test pads 120b. This arrangement is similar to that depicted in FIG. 2. However, in FIG. 3, two of the first lines 110a pass through the two of the third conductive layers 122b of each of the second test pads 120b, and the two of the first lines 110a passing through the same second test pad 120b are electrically connected to two adjacent first test pads 120a, respectively.

In the present embodiment, two of the first lines 110a or two of the second lines 110b are connected to the same first test pad 120a or to the same second test pad 120b. Hence, the first test pad and the second test pad can have enlarged widths. Thereby, notwithstanding the high density of the first lines 110a and the second lines 110b, each probe is still capable of individually contacting the first test pad 120a or the second test pad 120b rather than simultaneously contacting two adjacent first test pads 120a or two adjacent second test pads 120b. In other words, the peripheral circuit 100 can be used to test the active device array 60 with a relatively high density. Moreover, the widened widths of the first test pad 120a and the second test pad 120b give rise to an increase in a margin of contact of the probe. Namely, during the inspection, it is not required to precisely align the probe to the first test pad 120a or the second test pad 120b. In addition, contact reliability between the probe and the first test pad 120a or the second test pad 102b can also be enhanced.

Second Embodiment

Figure 4:
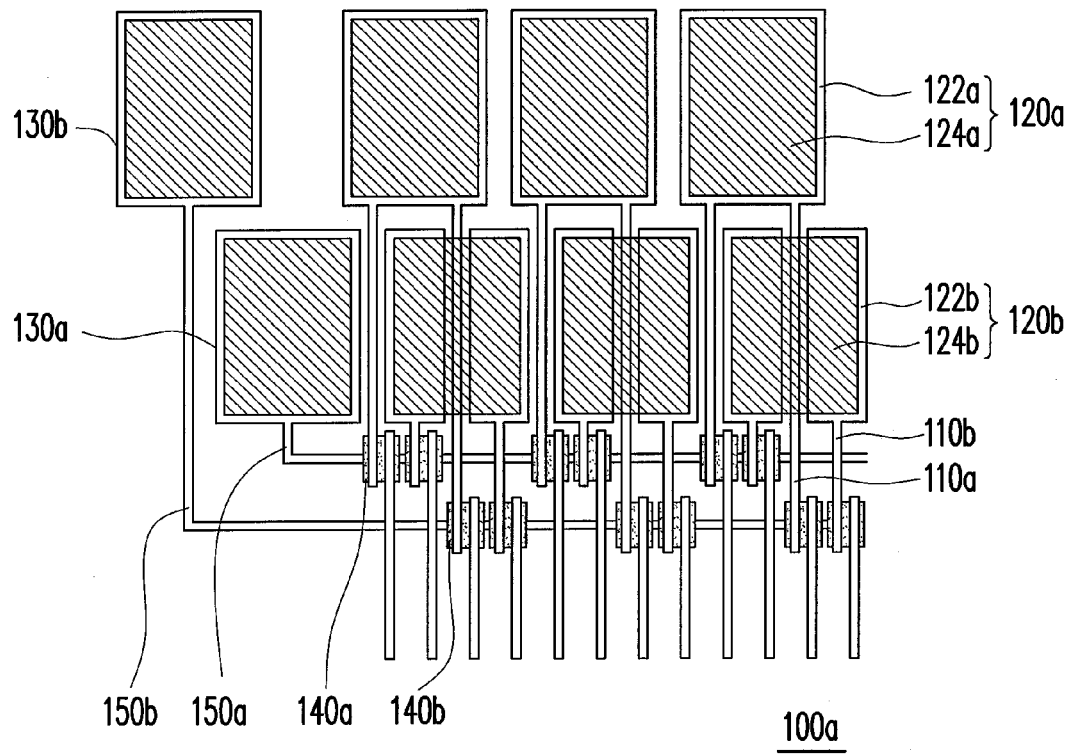
FIG. 4 is a schematic view of the configuration of a peripheral circuit according to a second embodiment of the present invention.

FIG. 4 is a schematic view of the configuration of a peripheral circuit according to a second embodiment of the present invention. It should be noted that the second embodiment is approximately identical to the first embodiment, and the same or similar reference numbers used in the second embodiment and in the first embodiment represent the same or the like elements. Differences between the two embodiments are described in detail hereafter, while similarities thereof are omitted.

Referring to FIG. 4, the difference between the present embodiment and the first embodiment rests in that a peripheral circuit 100a of the present embodiment further includes a first control pad 130a, a second control pad 130b, a plurality of first switching elements 140a, and a plurality of second switching elements 140b. Each of the first switching elements 140a is electrically connected to the first control pad 130a, while each of the second switching elements 140b is electrically connected to the second control pad 130b. In the present embodiment, the peripheral circuit 100a can further include a first control line 150a and a second control line 150b. The first switching elements 140a are electrically connected to the first control pad 130a through the first control line 150a, while the second switching elements 140b are electrically connected to the second control pad 130b through the second control line 150b.

One of the first switching elements 140a and one of the second switching elements 140b are respectively disposed on two first lines 110a connected to the same first test pad 120a. In addition, one of the first switching elements 140a and one of the second switching elements 140b are also respectively disposed on two second lines 110b connected to the same second test pad 120b. When the probe is in contact with either the first test pad 120a or the second test pad 120b, the first switching elements 140a and the second switching elements 140b can be controlled by the first control pad 130a and the second control pad 130b. Thereby, the two of the first lines 110a connected to the same first test pad 120a or the two of the second lines 110b connected to the same second test pad 120b can be tested.

For instance, the probe is in contact with one of the first test pads 120a during the inspection thereof, and the first switching elements 140a are turned off. Given that defects are found in the inspection, it can be inferred that the active device connected to the first lines 110a having the second switching elements 140b is defective. Next, the first switching elements 140a are turned on, and the second switching elements 140b are turned off. Given that defects are found in the inspection, it can be inferred that the active device connected to the first lines 110a having the first switching elements 140a is defective. Likewise, the two of the second lines 110b connected to the same second test pad 120b can be tested in the aforesaid manner. Thereby, the defects in the active device array 60 can be accurately located.

Third Embodiment

Figure 5:
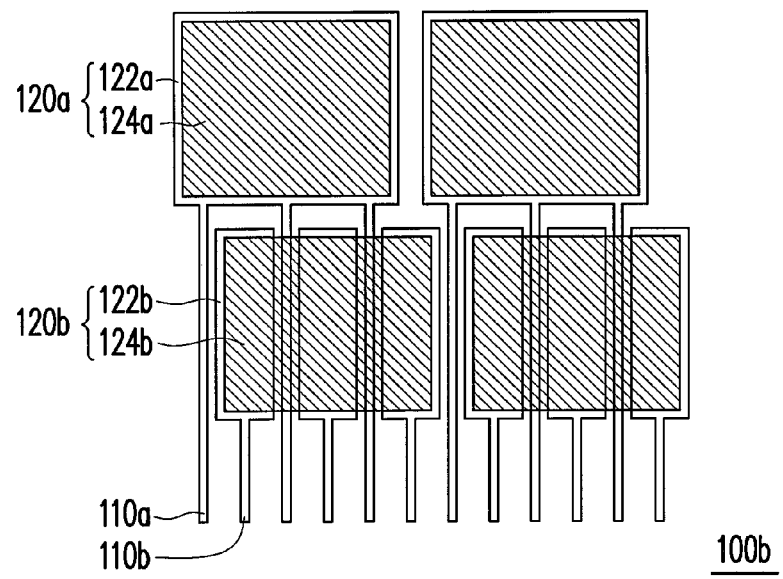
FIG. 5 is a schematic view of the configuration of a peripheral circuit according to a third embodiment of the present invention.

FIG. 5 is a schematic view of the configuration of a peripheral circuit according to a third embodiment of the present invention. It should be noted that the third embodiment is approximately identical to the first embodiment, and the same or similar reference numbers used in the third embodiment and in the first embodiment represent the same or the like elements. Differences between the two embodiments are described in detail hereafter, while similarities thereof are omitted.

The difference between the present embodiment and the first embodiment rests in that each of the first test pads 120a in a peripheral circuit 100b of the present embodiment is electrically connected to three of the first lines 110a, while each of the second test pads 120b has three of the third conductive layers 122b. One of the first lines 110a exclusively passes between every two of the three conductive layers 122b. As such, the first test pads 120a and the second test pads 12b can have increased widths, and thereby the active device array with a relative high density can be inspected.

Fourth Embodiment

Figure 6:
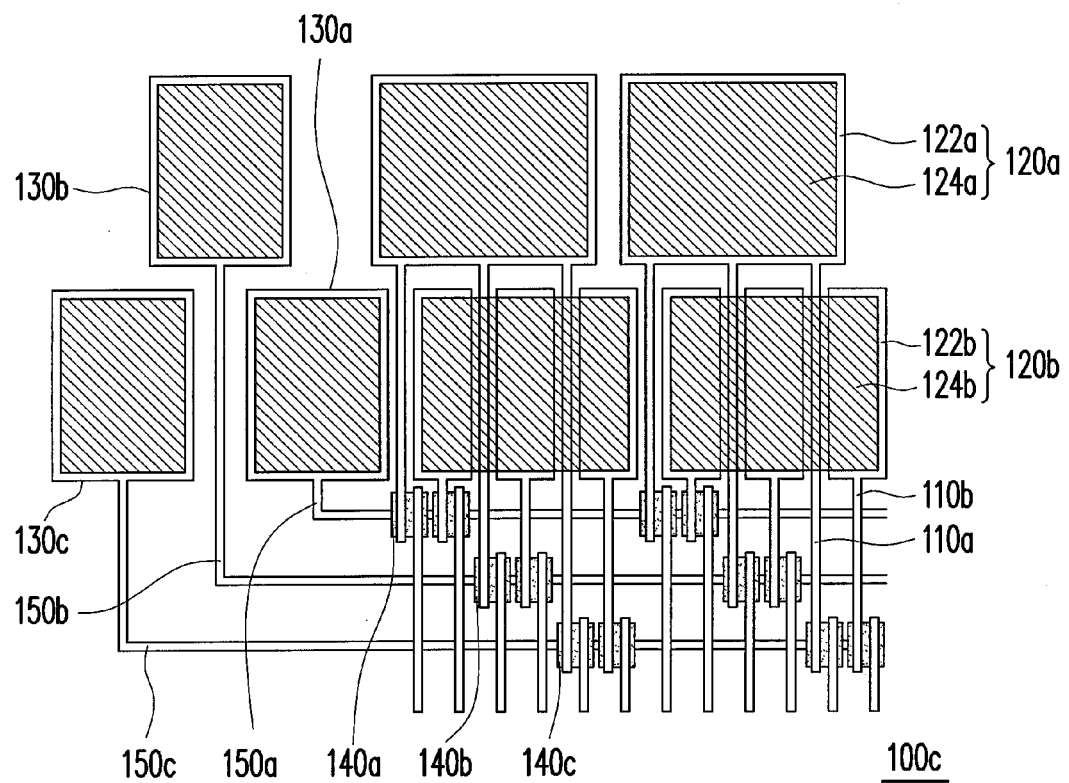
FIG. 6 is a schematic view of the configuration of a peripheral circuit according to a fourth embodiment of the present invention.

FIG. 6 is a schematic view of the configuration of a peripheral circuit according to a fourth embodiment of the present invention. It should be noted that the fourth embodiment is approximately identical to the third embodiment, and the same or similar reference numbers used in the fourth embodiment and in the third embodiment represent the same or the like elements. Differences between the two embodiments are described in detail hereafter, while similarities thereof are omitted.

Referring to FIG. 6, the difference between the present embodiment and the first embodiment rests in that a peripheral circuit 100c of the present embodiment further includes a first control pad 130a, a second control pad 130b, a third control pad 130c, a plurality of first switching elements 140a, a plurality of second switching elements 140b, and a plurality of third switching elements 140c. Each of the first switching elements 140a is electrically connected to the first control pad 130a. Each of the second switching elements 140b is electrically connected to the second control pad 130b. Each of the third switching elements 140c is electrically connected to the third control pad 130c. In the present embodiment, the peripheral circuit 100c can further include a first control line 150a, a second control line 150b, and a third control line 150c. The first switching elements 140a are electrically connected to the first control pad 130a through the first control line 150a. The second switching elements 140b are electrically connected to the second control pad 130b through the second control line 150b. The third switching elements 140c are electrically connected to the third control pad 130c through the third control line 150c.

One of the first switching elements 140a, one of the second switching elements 140b, and one of the third switching elements 140c are respectively disposed on three first lines 110a connected to the same first test pad 120a. In addition, one of the first switching elements 140a, one of the second switching elements 140b, and one of the third switching elements 140c are also respectively disposed on three second lines 110b connected to the same second test pad 120b. During the inspection of the three of the first lines 110a connected to the same first test pad 120a, the first switching elements 140a, the second switching elements 140b, and the third switching elements 140c disposed on the first lines 110a can be controlled by the first control pad 130a, the second control pad 130b, and the third control pad 130c. Thereby, the three of the first lines 110a connected to the same first test pad 120a can be tested.

In particular, the probe is in contact with one of the first test pads 120a during the inspection thereof, and the first switching elements 140a and the second switching elements 140b are turned off. Given that defects are found in the inspection, it can be inferred that the active device connected to the first lines 110a having the third switching elements 140c is defective. The first lines 110a having the first switching elements 140a and having the second switching elements 140b can also be inspected by means of the aforesaid method. Likewise, the three of the second lines 110b connected to the same second test pad 120b can also be inspected in said manner.

Fifth Embodiment

Figure 7:
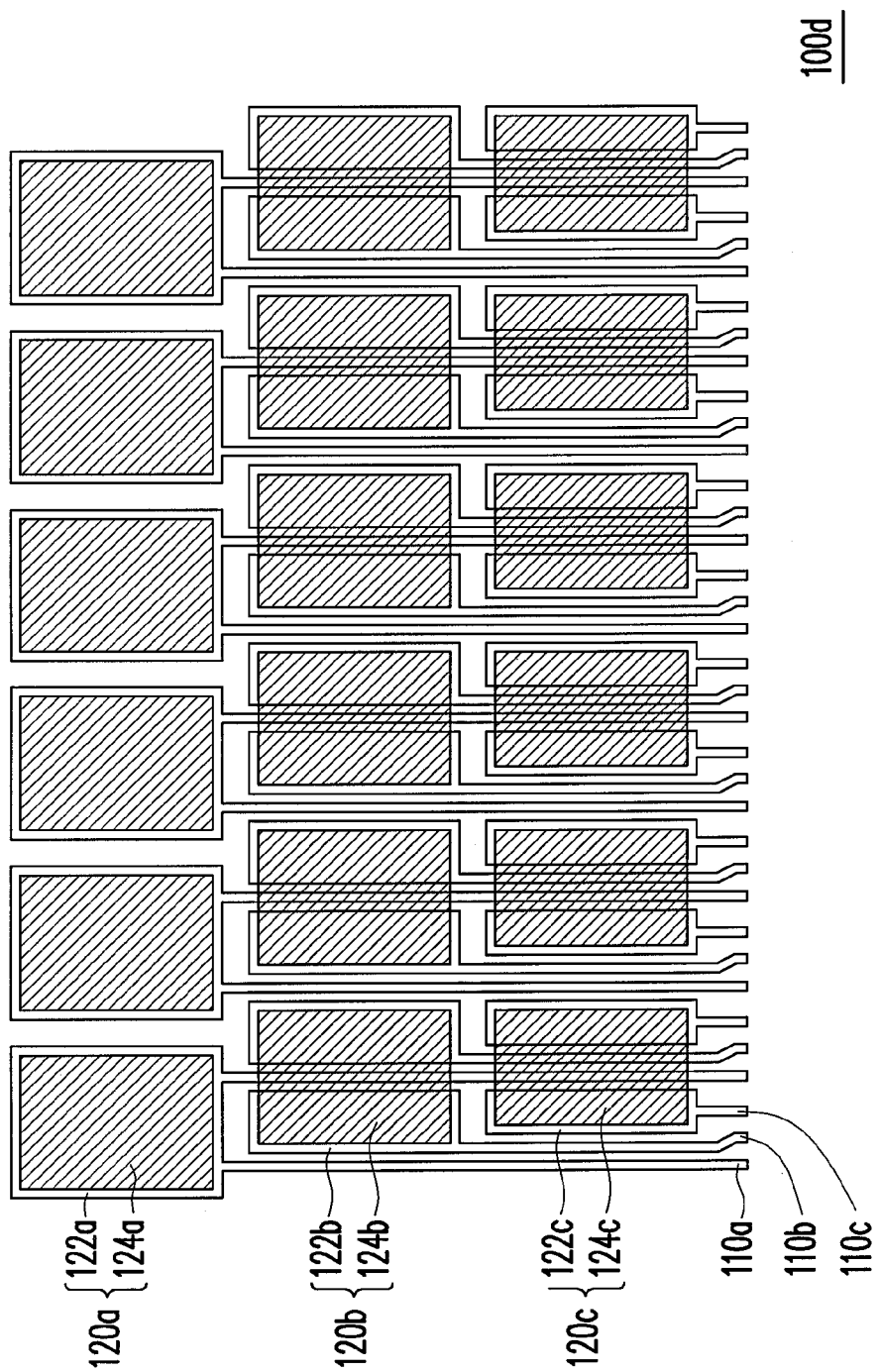
FIG. 7 is a schematic view of the configuration of a peripheral circuit according to a fifth embodiment of the present invention.

FIG. 7 is a schematic view of the configuration of a peripheral circuit according to a fifth embodiment of the present invention. It should be noted that the fifth embodiment is approximately identical to the first embodiment, and the same or similar reference numbers used in the fifth embodiment and in the first embodiment represent the same or the like elements. Differences between the two embodiments are described in detail hereafter, while similarities thereof are omitted.

Referring to FIG. 7, the difference between the present embodiment and the first embodiment rests in that a peripheral circuit 100d further includes a plurality of third lines 110c and a plurality of third test pads 120c. The third test pads 120c are interposed between the second test pads 120b and the active device array 60, while the third lines 110c are electrically connected to the third test pads 120c and the active device array 60. Each of the third test pads 120c is electrically connected to at least two of the third lines 110c.

In detail, each of the third test pads 120c has a sixth conductive layer 124c and a plurality of fifth conductive layers 122c. Here, the sixth conductive layer 124c is disposed on and electrically connected to each of the fifth conductive layers 122c, and each of the third lines 110c is electrically connected to one of the fifth conductive layers 122c and is electrically connected to the active device array 60.

In the present embodiment, each of the third test pads 120c may have two of the fifth conductive layers 122c, each of which is connected to one of the third lines 110c. Besides, one of the first lines 110a and one of the second lines 110b are interposed between every two of the fifth conductive layers 122c. The first lines 110a and the second lines 110b are insulated from the sixth conductive layer 124c. For example, an insulation layer can be interposed between the first lines 110a and the sixth conducive layer 124c and between the second lines 110b and the sixth conductive layer 124c, such that the first and the second lines 110a and 110b are insulated from the sixth conductive layer 124c.

In the above embodiments, the first lines 110a, the second lines 110b, and the third lines 110c can be directly connected to data lines of the active device array 60. However, people skilled in the pertinent art can also connect the first lines 110a, the second lines 110b, and the third lines 110c in a different manner. For example, the first lines 110a, the second lines 110b, and the third lines 110c can be connected to scan lines of the active device array 60. This will be discussed with reference to the following embodiment.

Sixth Embodiment

Figure 8:
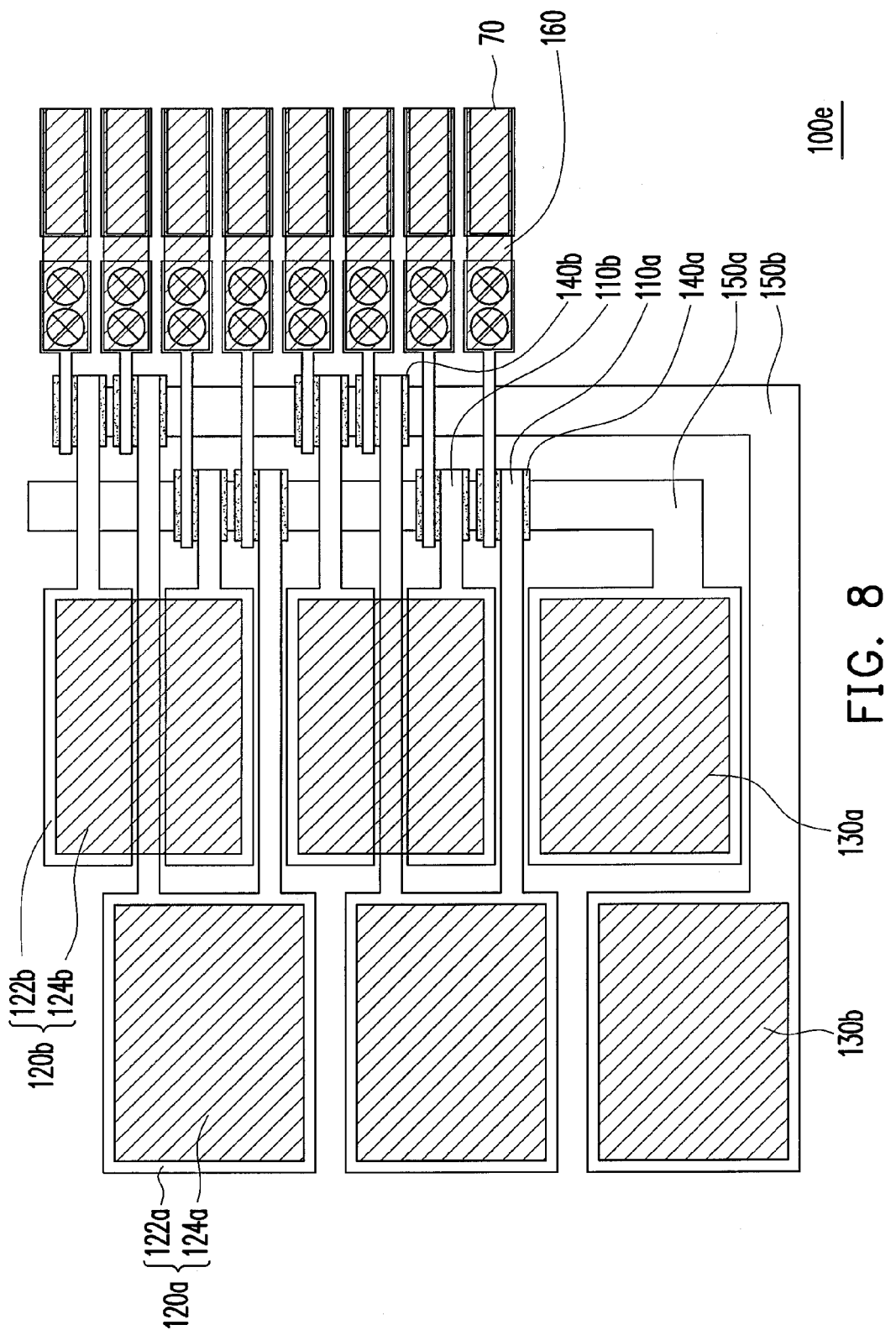
FIG. 8 is a schematic view of the configuration of a peripheral circuit and scan lines according to a sixth embodiment of the present invention.

FIG. 8 is a schematic view of the configuration of a peripheral circuit and scan lines according to a sixth embodiment of the present invention. It should be noted that the sixth embodiment is approximately identical to the second embodiment, and the same or similar reference numbers used in the sixth embodiment and in the first embodiment represent the same or the like elements. Differences between the two embodiments are described in detail hereafter, while similarities thereof are omitted.

Referring to FIG. 8, in a peripheral circuit 100e of the present embodiment, each of the first lines 110a and each of the second lines 110b are respectively connected to a scan line 70 of the active device array 60 through a connecting conductive layer 160. Here, a material of the connecting conductive layer 160 is, for example, ITO.

It should be noted that the arrangement of the peripheral circuit 100e of the present embodiment is not limited to the above. People skilled in the pertinent are can electrically connect the first lines 110a, the second lines 110b, and the third lines 100c described in the above-referenced first to fifth embodiments to the scan lines 70 of the active device array 60.

In view of the above, the peripheral circuit provided by the present invention has at least the following advantages.

1. In the present invention, multiple lines share the same test pad, such that all the test pads have increased widths. In comparison with the related art, the peripheral circuit of the present invention can be used to inspect the active device array with a relative high density. Moreover, the margin of contact between the probe and the test pads is enhanced, and the probe can then be in better contact with the test pads.

2. The switching elements are disposed on each of the lines for controlling the on/off state of the switching elements by means of the control pads during inspection. Thereby, the defects of the active device array can be accurately detected.

3. The inspection in which multiple lines share the same test pad can reduce both the number of the probes and the inspection time. Further, inspection costs can also be decreased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A peripheral circuit suitable for being disposed on a substrate having an active device array, the peripheral circuit being electrically connected to the active device array and comprising:

a plurality of first lines;

a plurality of second lines, wherein each of the first lines and each of the second lines are electrically connected to the active device array respectively;

a plurality of first test pads, each of the first test pads comprising:
- a first conductive layer electrically connected to at least two of the adjacent first lines;
- a second conductive layer disposed on and electrically connected to the first conductive layer;

a plurality of second test pads interposed between the first test pads and the active device array, each of the second test pads comprising:
- a plurality of third conductive layers, wherein the first lines pass through the third conductive layers, and each of the third conductive layers is electrically connected to one of the second lines respectively; and
- a fourth conductive layer disposed on and electrically connected to the adjacent third conductive layers, wherein the fourth conductive layer is insulated from the first lines.

2. The peripheral circuit as claimed in claim 1, wherein the third conductive layers of each of the second test pads are two in number, and the first lines which are electrically connected to each of the first test pads are two in number.

3. The peripheral circuit as claimed in claim 2, wherein the first lines and the second lines are alternately arranged.

4. The peripheral circuit as claimed in claim 2, wherein the first lines passing through the third conductive layers of each of the second test pads are two in number, and the first lines are electrically connected to one of the first conductive layers of the two adjacent first test pads respectively.

5. The peripheral circuit as claimed in claim 2, further comprising:
- a first control pad;
- a second control pad;
- a plurality of first switching elements electrically connected to the first control pad; and
- a plurality of second switching elements electrically connected to the second control pad, wherein the first lines connected to the same first test pad are electrically connected to the active device array through one of the first switching elements and one of the second switching elements respectively, while the second lines connected to the same second test pad are electrically connected to the active device array through one of the first switching elements and one of the second switching elements respectively.

6. The peripheral circuit as claimed in claim 1, wherein the third conductive layers of each of the second test pads are three in number, and the first lines electrically connected to each of the first test pads are three in number.

7. The peripheral circuit as claimed in claim 6, wherein the first lines and the second lines are alternately arranged.

8. The peripheral circuit as claimed in claim 6, further comprising:
- a first control pad;
- a second control pad;
- a third control pad;
- a plurality of first switching elements electrically connected to the first control pad;
- a plurality of second switching elements electrically connected to the second control pad; and
- a plurality of third switching elements electrically connected to the third control pad, wherein the first lines connected to the same first test pad are electrically connected to the active device array through one of the first switching elements, one of the second switching elements, and one of the third switching elements, while the second lines connected to the same second test pad are electrically connected to the active device array through one of the first switching elements, one of the second switching elements, and one of the third switching elements.

9. The peripheral circuit as claimed in claim 1, further comprising:
- a plurality of third lines electrically connected to the active device array;
- a plurality of third test pads interposed between the second test pads and the active device array, each of the third test pads comprising:
  - a plurality of fifth conductive layers, wherein the first lines and the second lines pass through the fifth conductive layers, and each of the fifth conductive layers is electrically connected to one of the third lines respectively; and
  - a sixth conductive layer disposed on and electrically connected to the adjacent fifth conductive layers, wherein the sixth conductive layer is insulated from the first lines and the second lines.

10. The peripheral circuit as claimed in claim 9, wherein the first lines, the second lines, and the third lines are alternately arranged.

11. The peripheral circuit as claimed in claim 9, wherein the first lines, the second lines, and the third lines are scan lines of a liquid crystal display.

12. The peripheral circuit as claimed in claim 9, wherein the first lines, the second lines, and the third lines are data lines of a liquid crystal display.

* * * * *